United States Patent
Kolton et al.

(10) Patent No.: US 10,810,564 B2
(45) Date of Patent: Oct. 20, 2020

(54) TIRE SELECTION DECISION SUPPORT SYSTEM AND METHOD

(71) Applicant: Bridgestone Americas Tire Operations, LLC, Nashville, TN (US)

(72) Inventors: Matthew R. Kolton, Franklin, TN (US); John T. Stoner, Wheaton, IL (US); Joyce R. Barbieri, Franklin, TN (US); Timothy J. Netzel, Nashville, TN (US); Amber C. Holm, Brentwood, TN (US); Kimberly M. Hughes, Bloomingdale, IL (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 758 days.

(21) Appl. No.: 15/346,904

(22) Filed: Nov. 9, 2016

(65) Prior Publication Data
US 2017/0132586 A1    May 11, 2017

Related U.S. Application Data

(60) Provisional application No. 62/252,620, filed on Nov. 9, 2015.

(51) Int. Cl.
| | |
|---|---|
| *G06Q 20/18* | (2012.01) |
| *G06Q 30/02* | (2012.01) |
| *G07F 17/00* | (2006.01) |
| *B60C 99/00* | (2006.01) |

(52) U.S. Cl.
CPC ............ *G06Q 20/18* (2013.01); *B60C 99/00* (2013.01); *G06Q 30/0202* (2013.01); *G07F 17/0014* (2013.01)

(58) Field of Classification Search
USPC .......................................................... 705/35
See application file for complete search history.

(56) References Cited

U.S. PATENT DOCUMENTS

| | | | | |
|---|---|---|---|---|
| 5,083,306 | A | * | 1/1992 | Steffel ................. G01M 17/028 378/207 |
| 5,289,369 | A | * | 2/1994 | Hirshberg .............. G06Q 10/02 235/382.5 |
| 5,831,861 | A | * | 11/1998 | Warn ...................... B67D 7/04 700/231 |

(Continued)

*Primary Examiner* — Kirsten S Apple

(57) ABSTRACT

A decision support system initially determines in response to the creation of a customer ticket a customer's driving style in accordance with user responses and input regarding driving habits and preferences, and calculates a driving style algorithm. The system compares the driving style algorithm to car tire profiles and determines which tires are best suited to the customer's driving style algorithm. Upon said determination, the selected car tires are presented to the customer for final selection in a comprehensive service platform environment for creating, forwarding, performing, and completing customer tickets amongst front end devices comprising a computer kiosk and a customer's mobile device, and a back end device comprising an employee's mobile device. Tickets created via a front end device are forwarded for performance to the back end device, wherein upon completion of service the ticket is finalized and forwarded back to a front end device for review and payment.

13 Claims, 13 Drawing Sheets

(56) References Cited

U.S. PATENT DOCUMENTS

| | | | |
|---|---|---|---|
| 6,954,758 B1 * | 10/2005 | O'Flaherty | G06Q 30/02 |
| | | | 707/802 |
| 7,114,656 B1 * | 10/2006 | Garver | A47F 9/048 |
| | | | 235/462.46 |
| 7,457,614 B2 | 11/2008 | Dasti et al. | |
| 7,464,092 B2 | 12/2008 | Lee et al. | |
| 7,603,367 B1 | 10/2009 | Kanter et al. | |
| 7,707,149 B2 | 4/2010 | Lee et al. | |
| 7,792,888 B2 | 9/2010 | Lee et al. | |
| 7,792,889 B1 | 9/2010 | Lee et al. | |
| 7,996,282 B1 | 8/2011 | Scott et al. | |
| 8,086,500 B2 * | 12/2011 | Lutnick | G06Q 10/06 |
| | | | 705/26.4 |
| 8,108,231 B2 * | 1/2012 | Boruff | G06Q 10/02 |
| | | | 705/26.41 |
| 8,112,318 B2 | 2/2012 | Kirian et al. | |
| 8,234,134 B2 * | 7/2012 | Fitzgerald | G06Q 30/0645 |
| | | | 705/307 |
| 8,265,609 B2 | 9/2012 | Deliwala et al. | |
| 8,271,309 B2 * | 9/2012 | Stephens | G06Q 30/0645 |
| | | | 705/27.1 |
| 8,311,901 B1 | 11/2012 | Carmichael et al. | |
| 8,374,334 B2 | 2/2013 | Sankaranarayanan | |
| 8,380,580 B2 | 2/2013 | Kirian et al. | |
| 8,538,836 B1 | 9/2013 | Scott et al. | |
| 8,589,212 B2 | 11/2013 | Pollak et al. | |
| 8,719,072 B2 | 5/2014 | Mueller | |
| 9,665,900 B1 * | 5/2017 | Claeson | G06Q 30/0631 |
| 2002/0174019 A1 | 11/2002 | Henderson et al. | |
| 2003/0004745 A1 | 1/2003 | Takakura et al. | |
| 2005/0060222 A1 * | 3/2005 | White | G06Q 10/06 |
| | | | 705/7.32 |
| 2005/0125336 A1 * | 6/2005 | Rosenblatt | G06Q 40/02 |
| | | | 705/39 |
| 2006/0179045 A1 | 8/2006 | Grinsfelder et al. | |
| 2008/0228411 A1 * | 9/2008 | Miyashita | B60C 19/00 |
| | | | 702/34 |
| 2010/0036670 A1 | 2/2010 | Hill et al. | |
| 2010/0106623 A1 * | 4/2010 | Menendez | G06F 17/243 |
| | | | 705/26.1 |
| 2010/0153207 A1 | 6/2010 | Roberts et al. | |
| 2011/0264581 A1 * | 10/2011 | Clyne | G06Q 20/10 |
| | | | 705/39 |
| 2013/0030890 A1 * | 1/2013 | Richardson | G06Q 30/00 |
| | | | 705/14.14 |
| 2013/0073386 A1 * | 3/2013 | Rose | G06Q 40/02 |
| | | | 705/14.53 |
| 2013/0151381 A1 | 6/2013 | Klein | |
| 2013/0159201 A1 | 6/2013 | Kirian et al. | |
| 2013/0199704 A1 | 8/2013 | Damon | |
| 2014/0052566 A1 | 2/2014 | Neidert et al. | |
| 2014/0067596 A1 | 3/2014 | McGovern et al. | |
| 2014/0143030 A1 | 5/2014 | Zeinfeld | |
| 2014/0207519 A1 | 7/2014 | Mueller | |
| 2014/0358731 A1 * | 12/2014 | Itte | G06Q 30/0619 |
| | | | 705/26.61 |
| 2015/0012192 A1 * | 1/2015 | Xu | F16H 63/42 |
| | | | 701/60 |
| 2016/0162971 A1 * | 6/2016 | Peterson | G06Q 30/0627 |
| | | | 705/26.63 |
| 2018/0025404 A1 * | 1/2018 | Harris | G06Q 30/0635 |
| | | | 705/26.62 |

\* cited by examiner

| ICON | CUSTOMER STATUS |
|---|---|
| 601 — Just Arrived | New |
| 602 — 👁 In Progress | Submitted For Inspection |
| 603 — 👁 Complete | Inspection Complete |
| 604 — 🔧 In Progress | Submitted for Service |
| 605 — 🔧 Complete | Service Complete |
| 606 — 4:20 PM | Upcoming Appointment |

*FIG. 6*

TIRE SELECTION DECISION SUPPORT SYSTEM AND METHOD

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of U.S. Provisional Patent Application No. 62/252,620, filed Nov. 9, 2015, and which is hereby incorporated by reference.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to a decisions support system for determining appropriately matching tires. More particularly, this invention relates to a system and method for determining one or more tires as appropriately matched to a customer's driving style, and presenting the one or more tires in accordance with vehicle products and services in a manner that is transparent and easy to understand for the customer.

The conventional tire and service industries have not been particularly innovative in digital tools and practices, yet competition increases daily. These industries have relied on the same expertise-based, top-down decision-making that "tells" a customer what their needs are. This type of dictatorial service can build resentment or concern in consumers, who may begin to distrust the services that are being offered and the technicians offering them. The tools and technology used by the tire and service industries have been built around this top-down approach, empowering technicians by providing them with detailed information while only providing carefully curated information like service and price to consumers.

What results is a service system that builds distrust and sometimes animosity between consumers and their service providers, by exploiting and often increasing the knowledge gap between the two parties. Without more information about the services being offered, and likewise without the tools necessary to facilitate and translate technical service information into details that the consumer can understand, consumers may have no reason to trust that the services being provided to them are necessary. This information divide prevents the development of long-term business relationships between customer and service provider, and risks permanent damage of trust when service providers abuse their discretionary authority and push services a consumer does not want or need. Even legitimate services can be called into question when consumers obtain second opinions from other tire and service providers and are told that the service recommended by the first provider is not necessary or needed. The consumer does not know which service provider to believe and often must go based on "gut feeling," dissolving knowledge-based trust between consumers and the tire and service industries as a whole.

Without shared knowledge and a trust-based relationship, customers are much more likely to change service providers on a whim and without understanding the value of services offered. Therefore, what is needed is a holistic, technology-implemented, information-focused decision support system and method that enables customers to hand-pick tires and services customized to their needs and driving style. By empowering the customer with knowledge and authority, they gain confidence in their purchase decision and in the team that helps educate them.

BRIEF SUMMARY OF THE INVENTION

A decision support system and method as disclosed herein may desirably facilitate long-term relationships between customer and service provider, at least in part by making the tire selection process personalized and easy to understand. An associated interface honors personalization and transparency to help facilitate honest conversations between the customer and service representative. One potential aspect of such a decision support system and method is to alleviate the most painful points in car care and lay the foundation for long-term loyalty and trust.

An exemplary decision support system and method as disclosed herein may employ as many as three platforms: a store computer kiosk ("Pod"), an employee's mobile device ("Portal"), and a customer's mobile device ("Mobile"). In the aforementioned example, the Pod and Portal exist as part of the store environment and may be used primarily (although not exclusively, as further described herein) by service representatives.

The Pod may generally be described as a relatively robust platform, half kiosk, half point-of-sale, configured for enabling and facilitating informed decisions on tires and service. As such, it may provide the ability to create tickets, view tickets, shop tires, shop services, and review the results of vehicle inspections. For the purpose of providing a collaborative experience, the Pod's interface may be designed with clear presentation top-of-mind. For example, arcane jargon, options, and fine-print may be purposefully eschewed. As another example, hierarchy may be strictly enforced and action items exaggerated. These small choices may preferably help novice customers feel competent and informed.

The exemplary portal provides a back-end view into a decision support system and associated sales platform of the present disclosure. It may in various embodiments be used exclusively by customer service representatives and provides the ability to create tickets, view tickets, edit pricing, and perform inspections. One category of tasks is those desirable to perform remotely. For example, remote ticket creation allows service representatives to greet customers at curb-side, and remote vehicle inspections naturally occur in the garage. Another category of tasks are procedural activities generally associated with inventory and service management, such as pricing, stock management, order processing, and other traditionally non-consumer-oriented retail activities.

The mobile platform refers to the customer's personal device, to which information may be sent at specific points in the experience. Mobile notifications may allow customers to leave the store while still feeling connected to their vehicle. For example, this channel may be used to notify customers that their vehicle inspection is complete, and allows them to view its results. In various embodiments, the mobile channel may expand to include time estimate updates, work-complete notifications, and a mobile payment flow.

In a particular embodiment of a system as disclosed herein for providing decision support to consumers of vehicle tires, a hosted server is linked to one or more user interfaces associated with the aforementioned platforms. A tire scanning device linked to the server may be configured to determine one or more characteristics of a current tire for a vehicle. A tire database linked to the server further comprises variables corresponding to each of a plurality of characteristics for available tires. The server generates a first characteristic curve for a driving style of the user with respect to a plurality of variables, and maps the first characteristic curve against each of a plurality of characteristic curves associated with the available tires and generated with respect to the same plurality of variables. One or more available tires may be matched to the user based on the current tire characteristics and the mapped characteristic curves, and subsequently presented for user selection via the user interface.

In one aspect of such an embodiment, the first characteristic curve may be generated based on the driving style inputs from the user and the one or more characteristics of the current tire determined via the tire scanning device.

In another aspect, the available tires may be matched to the user by filtering a subset of the available tires based on tire size as determined from the one or more current tire characteristics, and mapping characteristic curves for each of the subset of available tires against the first characteristic curve.

In another aspect, the available tires may be further matched to the user by identifying one or more of the subset of available tires having a lowest deviation in their respective characteristic curves with respect to the first characteristic curve. For example, the available tires may be matched to the user by identifying one of the subset of available tires having a highest ranking with respect to each of a plurality of tire criteria, such as: highest average quality rating; lowest price; best fit; and/or highest popularity rating.

For each of the presented one or more matched tires, the user interface may further display the respective characteristic curves mapped against the first characteristic curve.

In another aspect of such an embodiment, ticket information may be retrieved and displayed on the user interface in substantially real time regarding a tire product transaction for the consumer. The ticket information regarding the tire product transaction may include one or more status indications selectable from among a vehicle inspection result set, a pending tire service and a predicted performance for associated tire goods.

In still another exemplary aspect of such an embodiment, the system may include a user-interactive tire rack. A base of the tire rack includes one or more of the available tires disposed thereon, each associated with a respective unique tire identification token. A tire scanner is communicatively linked to the hosted server, wherein upon scanning by the tire scanner of a unique tire identification token, information about the tire associated with the respective token is generated on the user interface. The tire rack base may be mechanically configured to present the one or more available tires matched to the user automatically upon determination of the matched tires. In addition or in the alternative, the mobile platform may be implemented to scan a unique tire identification token, wherein information about the tire associated with the respective token is generated on the mobile platform user interface.

An exemplary user interface for the decision support system may be designed around the principles of clarity, readability, and openness. For example, all screens may preferably be readable by service representatives and customers alike. Familiar patterns and legible visual design may be typical tools to help accomplish this goal. Lists of interactive items (e.g. customers, service items, inspection items) may have similar and consistent layouts (see fig for details). Modal dialogs may provide greater detail about selected items and help stage complex interactions. They may further be used to edit customer profiles, view service details, view tire details, confirm ticket submission, configure tire match, execute payments and the like.

BRIEF DESCRIPTION OF THE SEVERAL VIEWS OF THE DRAWINGS

FIG. 6 is a graphic image representing an embodiment of icons for various transactional states in accordance with the present disclosure.

DETAILED DESCRIPTION OF THE INVENTION

Figure 1:
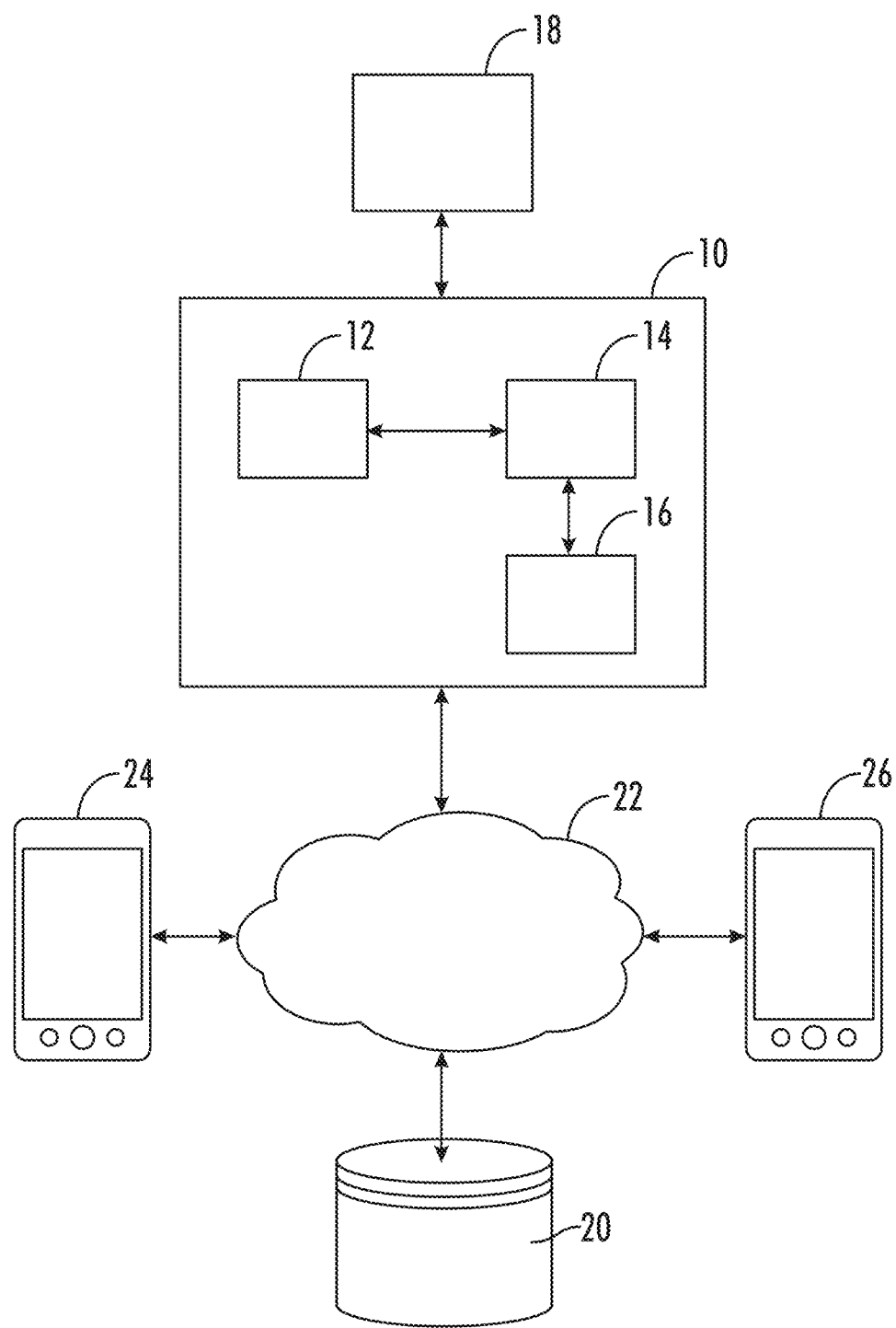
FIG. 1 is a block diagram representing an embodiment of a decision support system for selecting business products and services in accordance with the present disclosure.

Referring generally to FIGS. 1-13, various exemplary embodiments of an invention may now be described in detail. Where the various figures may describe embodiments sharing various common elements and features with other embodiments, similar elements and features are given the same reference numerals and redundant description thereof may be omitted below.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable medium known in the art. An exemplary computer-readable medium can be coupled to the processor such that the processor can read information from, and write information to, the memory/storage medium. In the alternative, the medium can be integral to the processor. The processor and the medium can reside in an ASIC. The ASIC can reside in a user terminal. In the alternative, the processor and the medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The term "user interface" as used herein may unless otherwise stated include any input-output module with respect to a hosted server network including but not limited to web portals, such as individual web pages or those collectively defining a hosted website, mobile applications, desktop applications, telephony interfaces such as interactive voice response (IVR), and the like. Such interfaces may in a broader sense include pop-ups or links to third party websites for the purpose of further accessing and/or integrating associated materials, data or program functions via the hosted system and in accordance with methods of the present disclosure.

The term "communications network" as used herein with respect to data communication between two or more parties or otherwise between communications network interfaces associated with two or more parties may refer to any one of, or a combination of any two or more of, telecommunications networks (whether wired, wireless, cellular or the like), a global network such as the Internet, local networks, network links, Internet Service Providers (ISP's), and intermediate communication interfaces.

The term "access devices" as used herein means any one of, or a combination of any two or more of, a computer kiosk, a service representative computer device, and customer mobile device. The term "computer kiosk" as used herein may be used in certain circumstances interchangeably with the term "Pod." The term "employee mobile device" as used herein may be used in certain circumstances interchangeably with the term "Portal." The term "customer mobile device" as used herein may be used in certain circumstances interchangeably with the term "Mobile."

The term "computer kiosk" means any computer hardware which a customer and service representative may access, retrieve ticket information therefrom, and input ticket information thereupon. A computer kiosk may be configured as a stationary, standing-height computer display for access by a customer and/or service representative in a retail store environment. The computer kiosk may have a touchscreen device sufficiently wide to allow both a customer and service representative standing in front of the computer kiosk to view information displayed thereon and input information collaboratively.

The term "user" as used herein may refer to either or both of a customer and an employee. In certain embodiments, a customer may be a user where no employee is present or engaged in the transaction. In certain embodiments, a customer and employee may both be a user wherein both are collaboratively engaging in the transaction. In certain embodiments, an employee may be a user wherein the employee is engaging in the transaction on behalf of the customer.

As used herein, the term "ticket" refers to a service transaction associated with a customer. A ticket may be contemplated as a collection of information associated with the customer service transaction. A ticket may also be contemplated as a virtual embodiment of a service ticket which may be transmitted between one or more access devices.

FIG. 1 is an embodiment of a decision support system for selecting business products and services in accordance with the present disclosure. In certain embodiments, a server linked to or comprising a computer kiosk 10 is comprised of a central processing unit 12 and a storage medium or memory medium 14 with one or more software instructions 16 stored thereupon. The software instructions 16 may be executable by the processor 12 to display an interactive user interface on a touchscreen device 18. The software instructions 16 may be further executable by the processor 12 to receive touch input via the interactive user interface displayed on the touchscreen device 18, determine user data in accordance with the touch input, and store the user data on an information database 20 communicatively connected to the computer kiosk 10 via a communications network 22.

In an embodiment, the computer kiosk 10 may execute the software instructions 16 to create a customer ticket for purchasing and monitoring the progress of certain services such as, for example, tire replacement. A user may select an option to create a ticket in accordance with the user interface displayed on the touchscreen device 18. In certain embodiments, user information may be selectively entered into the computer kiosk 10 via the touchscreen device 18 and may be stored upon the information database 20 in association with the user. In certain embodiments, user information may be selectively retrieved from the information database 20 during the ticket creation process.

For example, the computer kiosk 10 may request via the user interface login information associated with a user such as name, e-mail address, and phone address. If the information that the user enters matches a customer profile stored on the information database 20, the computer kiosk 10 may query the information database 20 for user information associated with the user profile; comparatively, if no customer profile exists for the entered information, the computer kiosk 10 may create a new customer profile in association with the entered information and store that customer profile on the information database 20.

Upon determination of a respective user profile, the computer kiosk 10 may prompt a user for information via the user interface and receive user input via the touchscreen device 18. In an embodiment, the user interface may prompt the user for desired products and services such as, for example, new tires or brake pad replacement. In said embodiment, the user may select one or more of the proposed products or services to be purchased or performed, respectively. The computer kiosk 10 may then compile the user-inputted information, including selected products and services, into a customer ticket and submit that ticket to a ticket queue, the inputted information stored upon the information database 20.

In an embodiment, the computer kiosk 10 may additionally prompt a user for information pertaining to a customer's driving style, the customer's driving style comprising one or more driving variables. For example, the computer kiosk 10 may present via the user interface a series of questions for the user to answer, each answer associated with one or more values for driving variables. Driving variables may include but are not limited to qualities like handling, comfort, tread life, and fuel efficiency. The computer kiosk 10 may determine from the user answering the questions the customer's driving style and then store that information in association with the customer upon the information database 20.

Customer tickets and associated customer ticket information may be retrieved and displayed on an employee computer device 24. In certain embodiments, the employee computer device 24 may be configured as a tablet, netbook, smartphone, or other mobile computer system designed for portability. In certain embodiments, the employee computer device 24 may be operated by a service technician capable of performing or otherwise associated with someone capable of performing the services offered.

The employee computer device 24 retrieves the customer ticket information and displays the ticket information on the employee computer device 24. In certain embodiments, the customer ticket information may be selectively retrieved at the request of the service technician; in other embodiments, the customer ticket information may be automatically retrieved in accordance with software instructions on the employee computer device 24. In further embodiments, the customer ticket information may be sorted and prioritized in accordance with one or more prioritization factors including, but not necessarily limited to, the time and date of the customer ticket creation. In said further embodiments, other prioritization factors may be included such as: the number and complexity of services requested; the time a given service will take to complete; the number of resources required to complete a given service; customer status; price of services requested; and so forth.

In certain embodiments, the employee computer device 24 may be configured to provide a user interface for the service technician to input inspection information associated with a service. For example, where a user has requested on the customer ticket an oil change, the employee computer device 24 may display on the user interface performance inputs pertaining to an oil change such as: whether the oil change service has been completed; whether supplemental services have been completed; whether tire pressure is acceptable; to what pressure the tires have been set, if adjusted; whether the air filter is in need of replacement; whether the battery is in need of replacement; whether the engine belts are in need of replacement; the condition of the old oil; the level of the old oil; general comments associated with the service; and so forth.

In certain embodiments, the employee computer device 24 may be communicatively connected through the communications network 22 to an inventory database. In said embodiments, the employee computer device 24 may be configured to perform inventory and order management and adjustment whereby a service technician can, through the device's interface, monitor and selectively adjust stock quantity, inventory, price, cost, SKUs, and other retail- or service-oriented information. In certain embodiments, the employee computer device 24 may be configured to perform similar or the same functions as the computer kiosk 10.

When one or more services have been marked as complete on the employee computer device 24, the employee computer device 24 updates the customer ticket stored on the information database 20. A user may request a status of completion for a customer ticket on the computer kiosk 10 whereupon the software instructions 16 are executed to retrieve the information associated with a customer ticket from the information database 20 and display said information on the touchscreen device 18. If the one or more services are complete, the computer kiosk 10 may execute software instructions 16 to enable a customer to pay for the services rendered. In certain embodiments, the computer kiosk 10 may be communicatively connected to payment processing hardware such as, for example, a credit card terminal. In alternative embodiments, the computer kiosk 10 may allow a user to enter payment information via the touchscreen device 18.

In certain embodiments, a user may be able to request customer ticket information and status via a customer mobile device 26 communicatively connected via the communications network 22. In an embodiment, a customer may receive a notification on the customer mobile device 26 upon the completion of services associated with a customer ticket via a communications protocol such as, for example, text message, push notification, or e-mail. In an embodiment, a customer may be enabled through a website portal or a mobile application to pay for the services rendered in association with a customer ticket from the customer mobile device 26.

Figure 2:
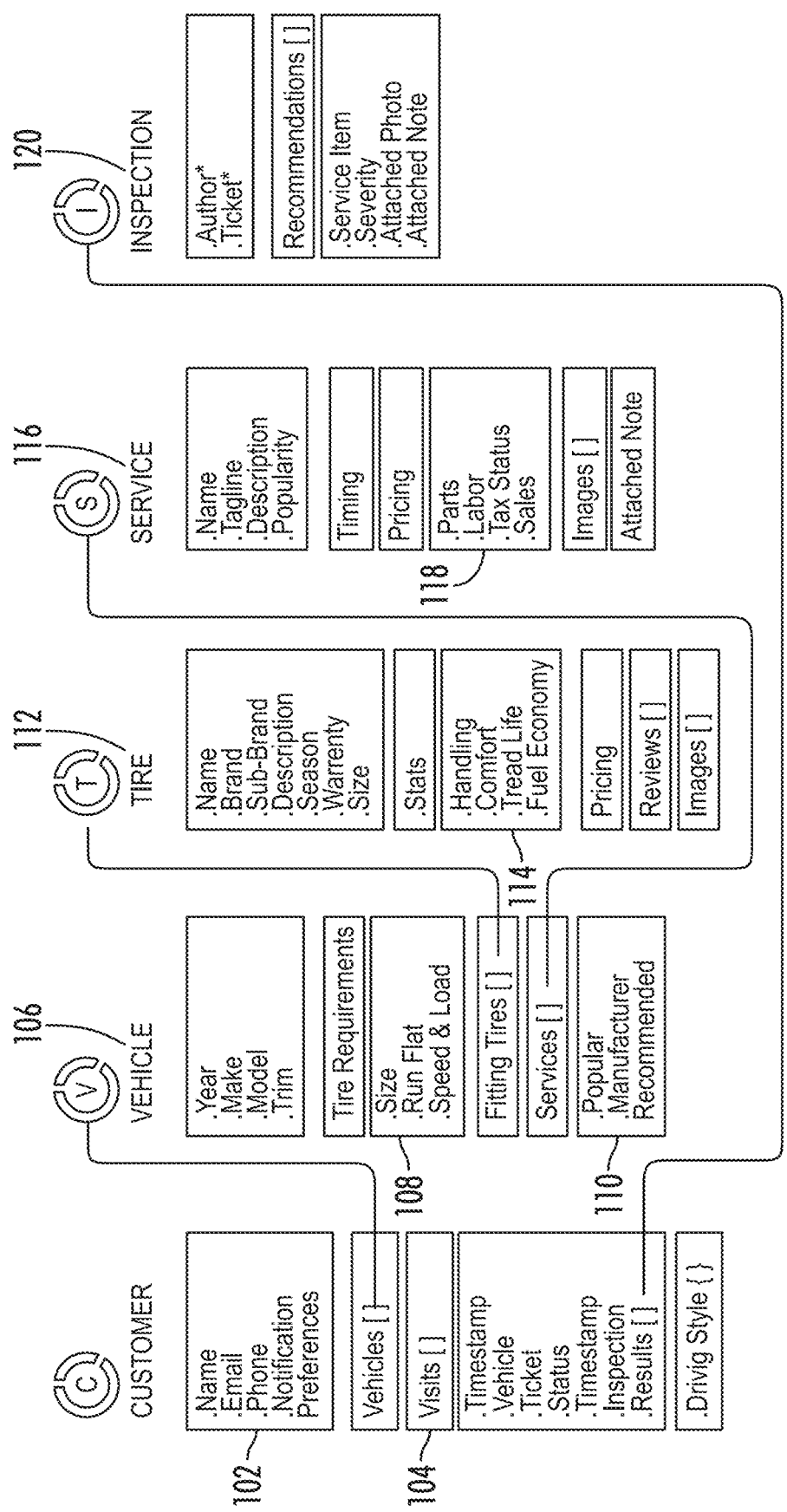
FIG. 2 is an entity relationship diagram representing an embodiment of profile data and database relationships for decision support in accordance with the present disclosure.

FIG. 2 is an entity relationship diagram representing an embodiment of profile data and database relationships for decision support in accordance with the present disclosure.

A customer profile may include a set of profile information 102 including, but not necessarily limited to: name, e-mail address, phone number, notification preferences, vehicles owned, service visits, and driving style. The category of "service visits" may include a subset of ticket information data 104 including: the time the customer ticket was created, ID of the vehicle serviced, customer ticket ID, customer ticket status, the time the customer ticket was completed, and inspection results. "Vehicles [Owned]" and "Inspection Results" may be selected from data associated with entries within the "Vehicle" data set 106 and "Inspection" data set 120, respectively. In certain embodiments, a customer's driving style may be determined in accordance with a customer's driving profile as determined in accordance with method 400 below.

The "Vehicle" data set 106 may include a comprehensive or semi-comprehensive list of all vehicles for which service may be performed. The vehicle data set 106 may include: year, make, model, trim, color, and various additional tire requirements as may be relevant and as would be appreciated by one of skill in the art. "Tire Requirements" may further contain a subset of tire limitation information 108 including: sizes of tire that the vehicle supports; whether the vehicle requires or recommends "run flat" tires; and recommended and/or maximum speeds and loads for the vehicle.

"Fitting Tires" and "Services" may be selected from data associated with entries for the "Tire" data set 112 and "Service" data set 116, respectively. Additionally, "Services" may further contain a subset of service recommendation information 110 including popular services and manufacturer-recommended services for the associated vehicle.

The "Tire" data set 112 may include a comprehensive or semi-comprehensive list of all tires available to the service provider for installation. The tire data set 112 may include: tire name, brand, sub-brand, tire description, recommended season, warranty terms, tire size, tire statistics, pricing, reviews, and tire images. "Tire statistics" may further contain a subset of tire profile information 114. In certain embodiments, tire profile information may be matched against a customer's driving profile as described in accordance with method 400 below. Tire "Reviews" and "Images" may further contain a subset of individual reviews and images for each tire.

The "Service" data set 116 may include a comprehensive or semi-comprehensive list of all services rendered by the service provider. An exemplary service data set may include one or more of the following, further without limitation thereto: service name; service tagline; service description; a popularity rating; estimated time to perform the service; estimated price to complete the service; service images; and service notes. "Pricing" may further contain a subset of price determination factors 118 including: parts, labor, tax status, and sales. Service "images" may further contain a subset of individual images for each service. In certain embodiments, the "Attached Note" may pertain to: service provider notes associated with the service performance generally; service provider notes associated with the service with respect to a specific vehicle; service technician notes associated with the service with respect to a specific customer visit; or a combination of one or more thereof.

The "Inspection" data set 120 may include inspection information in relation to a customer ticket including: the author of the inspection report for a ticket; the ID of the customer ticket; and the author's recommendations which may include one or more service items selected from the "Service" data set 116, the severity of the issue noted, an attached photo for demonstrating the issue noted, and an attached note for describing why the service is recommended.

Figure 3:
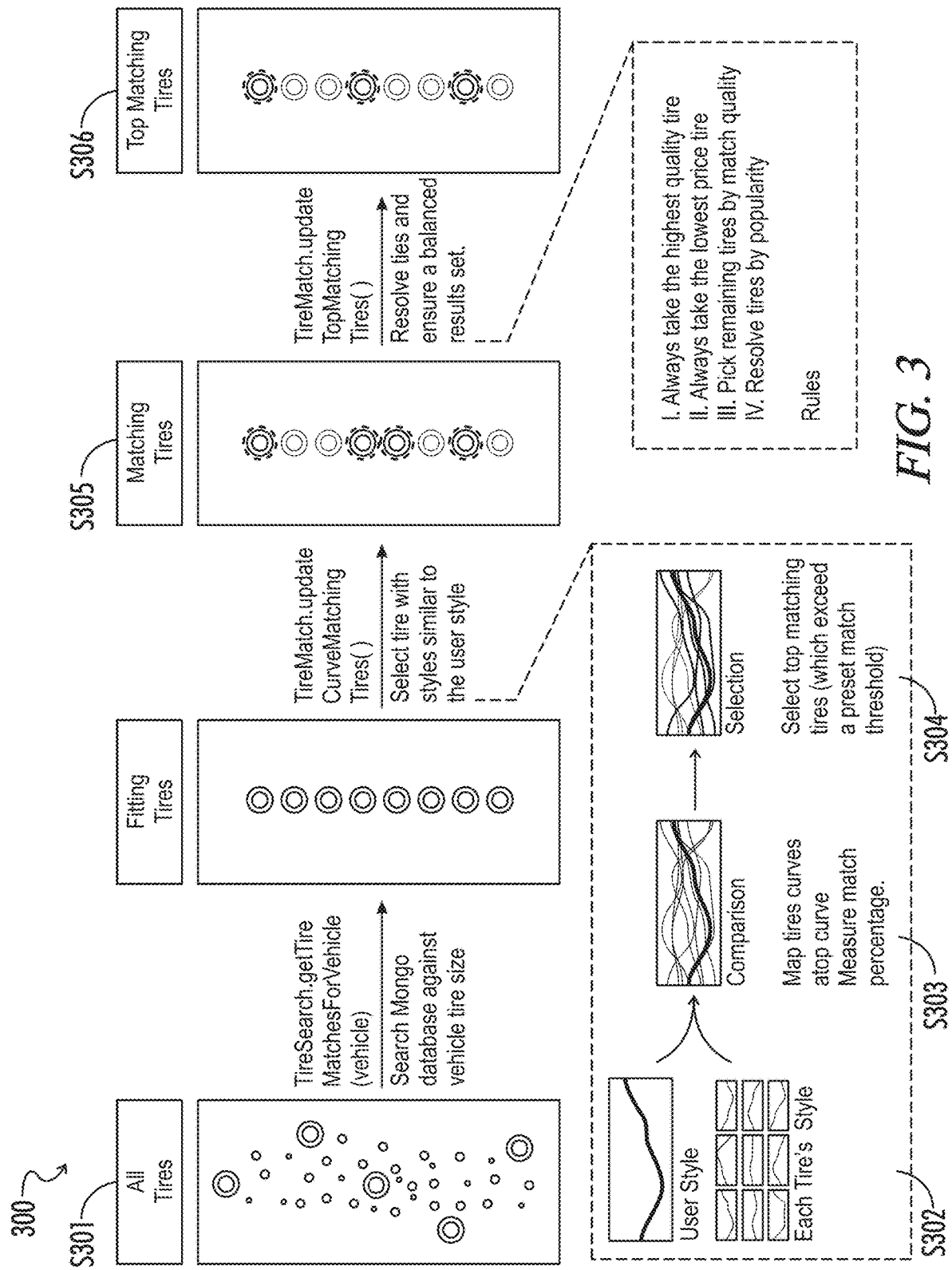
FIG. 3 is a graphical diagram representing an embodiment of a tire matching algorithm process and method in accordance with the present disclosure.

FIG. 3 is a graphical diagram representing an embodiment of a tire matching algorithm process and method in accordance with the present disclosure. The method 300 begins at a first step S301 when the decision support system queries a tire database for all tires of an appropriate size for a customer's determined vehicle. In certain embodiments, the appropriate tire size may be input by a user, whereas in other embodiments the appropriate tire size may be determined in accordance with a database matching vehicle make, model, and/or VIN (as may be manually entered by for example keystroke, or as otherwise may be entered by implementing scanning hardware with respect to machine readable indicia associated with the VIN number for the vehicle) to one or more sizes and/or tires. In still other embodiments the tire size may be determined in accordance with tire scanning hardware operatively connected to the decision support system, wherein laser emissions and pulse return sensors or the like may be implemented to identify relevant contours and dimensions of the tire.

When appropriately sized tires are determined, the system then proceeds to step S302 and determines a customer's driving style. In certain embodiments, a customer's driving style may be determined largely via user input in step S302 in accordance with the method 400 described below. In an alternative embodiment, a customer's driving style may in addition or otherwise be determined in accordance with a communicatively connected tire analyzing device capable of scanning a customer's tires and/or vehicle riding characteristics and determining certain aspects of the customer's driving style therefrom. In an embodiment, the customer's driving style may be calculated as an algorithm comprising at least the customer's driving style information (as manually provided and/or as automatically derived from the available data). The customer's driving style algorithm may be graphically presented in one example only via back-end displays to host employees or the like, but in other examples may be made available for review by the customer as well, and may typically be represented as a multiple measurement line chart, column chart, area chart, as a matrix of values, etc., where each value is determined in accordance with a particular driving quality. For example, a matrix entry or graph line X-axis value may represent a relative importance placed on "stopping power." Values may be relative to one another so that a higher value in one entry may represent a comparatively higher importance and/or relevance to the customer in that value over a comparatively lower value.

Once the user's driving style is determined and/or queried, the system proceeds to step S303 and compares the user's driving style to the tire profile algorithm, the tire profile algorithm comprising at least the tire profile information for each tire arranged in same or similar fashion as the customer driving style algorithm, of the one or more appropriately sized tires selected in S301. The system may determine one or more tire matches in accordance with a best fit algorithm comparing the user driving style to the tire profile algorithm. In an embodiment, the best fit algorithm may sum the deviations for each quantified data point such that lower sums represent better fits. In another embodiment, the best fit algorithm may calculate the total area of deviance of the customer's driving style chart curve against each of the one or more tire profile chart curves such that lower values for the area of deviance represent better fits.

In step S304, the system selects one or more of the tires with same or similar fits as determined in accordance with the best fit algorithm of step S403. In an embodiment, the number of tires selected may be determined in accordance with one or more selection parameters. For example, selection parameters may determine that only tires with a determined algorithmic deviation of 10% or less may be selected. In another example, the selection parameters may weigh the one or more driving style variables differently such that deviations in one variable are more or less important than deviations in another variable.

Once the subset of matching tires is selected in step S304, the system proceeds to step S305 and selects the top matching tires from the selected subset. In an embodiment, the top matching tires may be selected in accordance with respective tire data for each tire. For example, the system may make one or more selections of top matching tires from the subset by determining one or more of the following: the tire or tires with the highest average quality rating or ratings; the tire or tires with the lowest price; the tire or tires with the best fit; the tire or tires with the highest popularity rating. In a particular embodiment, the system may select at least the highest quality tire, the lowest price tire, and one or more tires with the best fit tire profile.

The system may further apply case-specific business-oriented logic for the purpose of resolving any ties where tires have the same quality rating, price, or best fit tire profile by selecting the tire with the comparatively higher popularity, or otherwise based on manufacturer preferences, temporal factors, related promotions, or the like.

Once the top matching tires have been determined, the system proceeds to S306 and presents the determination of top matching tires for user selection. In an embodiment, the top matching tires may be presented to the user via a user interface as embodied in FIG. 12.

Figure 4:
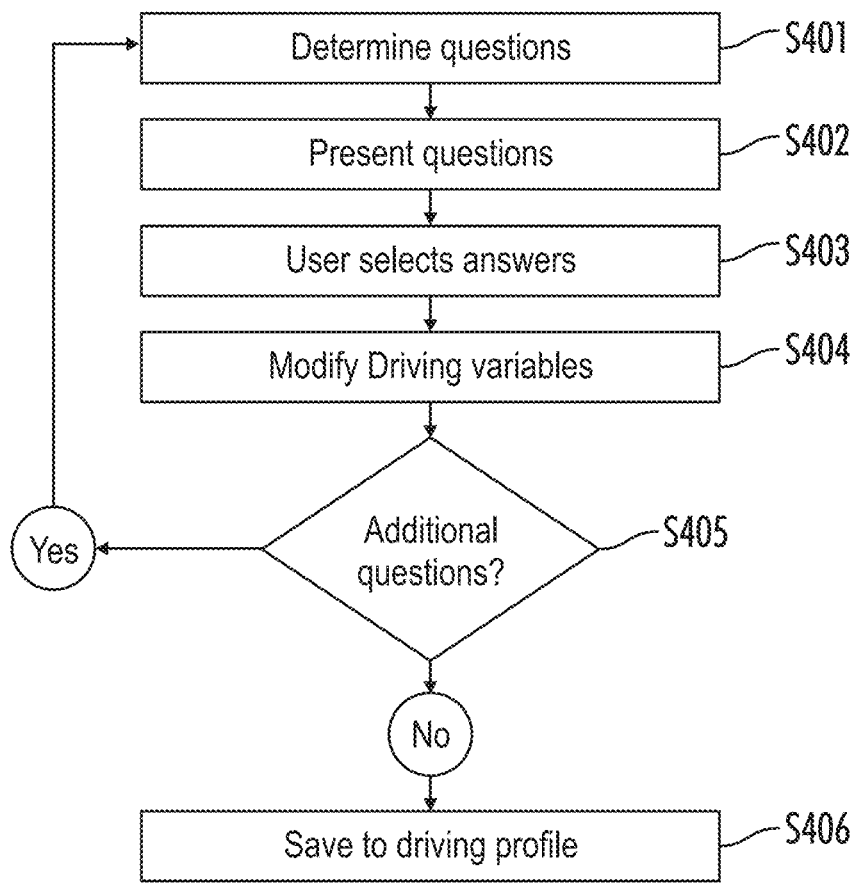
FIG. 4 is a flowchart representing an embodiment of an algorithm for determining a customer's driving style in accordance with the present disclosure.

FIG. 4 is a flowchart representing an embodiment of an algorithm for determining a customer's driving style in accordance with the present disclosure. The algorithm 400 begins at a first step S401 when a user initiates a quiz, for example by activating an executable questionnaire via their respective mobile interface, comprising a series of questions pertaining to a customer's driving style and/or values. The system determines one or more questions to present to the user and queries a database for the one or more questions and associated answers. In an embodiment, each associated answer is itself associated with one or more values each pertaining to one or more driving variables.

Upon determination of the one or more questions, the system presents the question or questions and their respective answers to the user in step S402. In an embodiment, answers may be binary, such as for example in the form of a "yes/no" decision. In alternative embodiments, more than two answers may be presented. In step S403, a user may select an answer for each of the one or more answers presented. In step S404, the system determines the one or more variable effects associated with each of the user-selected answers and then performs the determined variable effect upon the one or more associated driving variables. In an embodiment, the variable effect may be value-additive, such that an answer will increase the cumulative sum of one or more driving variables associated with a customer's driving style profile. For example, one answer may result in the addition of two points to the "comfort" category and the addition of one point to the "handling" category, whereas another answer may result in the addition of two points to the "fuel" category and the subtraction of two points from the "comfort" category.

Upon modification of the driving variables associated with a customer driving style profile, the system then determines in step S405 if more questions should be presented. In an embodiment, the number of questions may be finite, such that one or more questions are presented in sequential sets until no more questions remain. In another embodiment, the number of questions may be determined dependent upon the one or more variables associated with the user driving style profile. For example, the system may continue to select from a bank of unanswered questions until the user driving style profile has met a predetermined sufficiency of statistical significance.

If the system determines that more questions remain to be asked, then the process repeats by returning to S401 for a new question or set of questions. If the system determines that no more questions remain to be asked, then the process concludes at step S406 by saving the variable data determined from the user responses to the customer's driving style profile.

Figure 5:
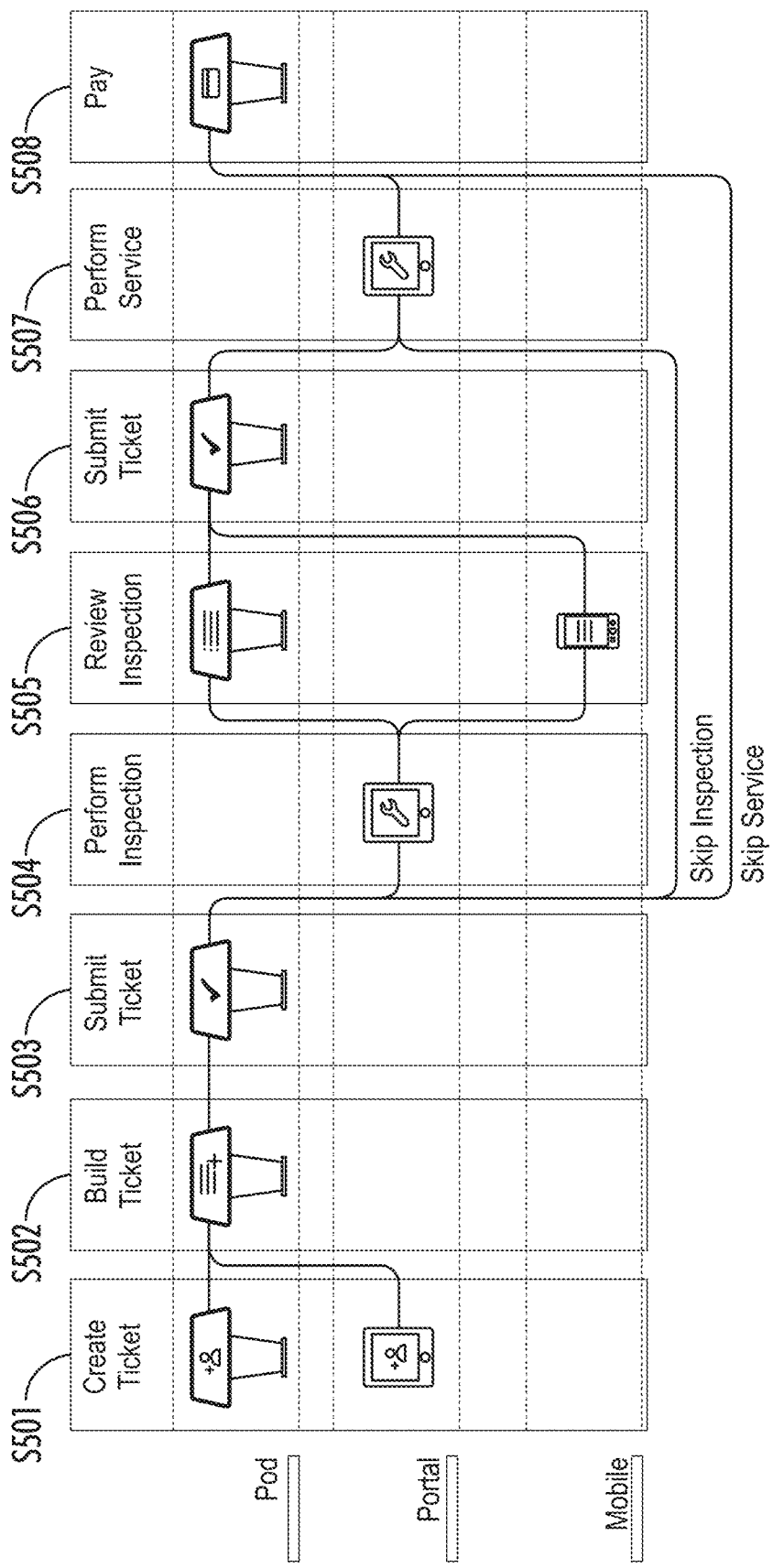
FIG. 5 is a flowchart representing an embodiment of a user service transaction in accordance with the present disclosure.

FIG. 5 is a flowchart representing an embodiment of a user service transaction in accordance with the present disclosure. In a first step S501, a user may create a ticket on a computer kiosk device ("Pod") or alternatively on a service representative computer device ("Portal"). In an embodiment, the Pod may be a stationary computer kiosk with touchscreen interface configured to allow an employee and customer to use the device simultaneously. In another embodiment, the Portal may be a portable computing device such as a smart phone or tablet. A user may create a ticket on either device, wherein the ticket is associated with a customer. In certain embodiments, a user may be able to retrieve a customer profile associated with the customer in one or more previous transactions; in alternative embodiments, where no previous transactions for a customer exist, customer information may be inputted and aggregated into a new customer profile associated with the customer.

In step S502, the user may continue to build the ticket on the Pod in accordance with the customer's needs by adding requisite products and services to be purchased and performed respectively. In an embodiment, whereas a ticket in S501 may optionally be build upon a Pod or a Portal, building a ticket may occur only on the Pod. For example, a mechanic may create a ticket in accordance with performing maintenance upon a customer's vehicle wherein the mechanic notices a repair that should be brought to the customer's attention; the mechanic creates a ticket upon the Portal device, whereupon the customer may approve or deny the repair service upon the Pod device in accordance with S502. In certain embodiments, the user may select various products or services to be performed and purchased.

Once a user has completed a ticket to a customer's satisfaction, the ticket may be submitted via the Pod in step S503. Upon submission, if an inspection has been selected for performance by the user, a notification may be sent to the Portal device to prompt for the performance of an inspection. A technician may perform an inspection and record his or her findings alongside appropriate price and time estimates upon the ticket (S504). Alternatively, if no inspection has been selected for performance, the steps S504-S506 are bypassed, whereupon the process resumes in step S507 if a service has been selected for performance or alternatively in step S508 if no service has been selected for performance.

If an inspection has been performed in accordance with step S504, a user may, in step S505, be able to review the state of the inspection via a Pod or, in an embodiment, on the customer's mobile computing device ("Mobile"). The customer's mobile device may optionally be a cell phone, smart phone, laptop, or desktop device such that the user does not need to be on or near the premises to review the status of his or her ticket. Once the inspection is complete, the ticket may be submitted for service (S506). In certain embodiments, the ticket submission for service may not occur until a customer has approved of the submission in accordance with the review upon either a Pod or Mobile device. In certain embodiments, one or more inspection results may be sent to the user via an electronic communications protocol such as, for example, Email or SMS.

Once the ticket has been submitted for performance of a service in accordance with either S503 or S506, a notification may be sent to the Portal device to prompt for the performance of the requisite service (S507). Once the service has been marked as completed by a technician, or alternatively if no service was selected for performance, then a customer may be able to pay for the ticket's associated products and services via the Pod (S508). In an embodiment, a customer may pay for the ticket products and services directly upon the Pod, whereas in other embodiments the payment processing may occur separately from the presentation of the ticket for verification upon the Pod of prices and services performed.

Two potential shortcuts to the above flow are notable. In the first case, the customer may elect to not perform a vehicle inspection; in this case the store performs service immediately. In the second case the customer buys a retail item that does not require service (e.g. wiper blades, battery, brand merchandise, etc.); in this case the system can skip directly to payment.

FIG. 6 is a graphic image representing an embodiment of icons for various transactional states in accordance with the present disclosure. Each icon (601-606) may be associated with and presented upon a ticket to identify the state of the ticket transaction as it progresses through the ticket transaction flow in accordance with the embodiment described in FIG. 5. A first icon 601 identifies tickets which have been created but not yet submitted for processing. A second icon 602 identifies tickets which have been submitted by the user requesting performance of an inspection, but the inspection has not yet been performed. A third icon 603 identifies tickets for which an inspection has been performed and completed, the associated results included in the ticket. A fourth icon 604 identifies tickets which have been submitted by the user requesting performance of a service following the performance of, or without the necessity of performing prior, an inspection. A fifth icon 605 identifies tickets for which the requested performance of a service has been completed and is awaiting customer payment. A sixth icon 606 identifies tickets which have been scheduled for upcoming performance but are not yet ready for inspection or service submission. In an embodiment, the sixth icon 606 may be dynamic such that the time of the appointment is displayed within the icon. In an embodiment, a different icon may be used to identify tickets which have been completed and paid and are therefore closed. In certain embodiments, graphical highlights such as color and opacity may be used to denote important transaction states which are awaiting customer feedback. For example, certain icons may use a color fill to denote visual importance, whereas other icons may use a color outline to identify lesser importance, and remaining icons may use no color to identify minimal importance.

Figure 7:
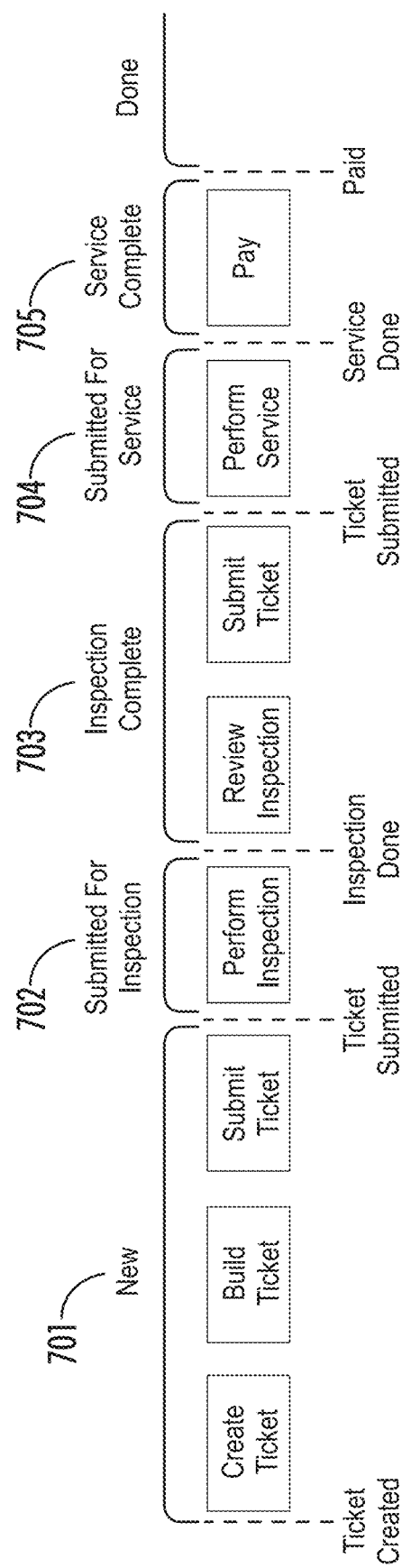
FIG. 7 is a graphical diagram representing in an embodiment the relationship between transactional states and the steps of the user service transaction in accordance with the present disclosure.

FIG. 7 is a graphical diagram representing the relationship between transactional states and the steps of the user service transaction in accordance with one embodiment of the present disclosure. The icons in FIG. 6 may for illustrative purposes be displayed in accordance with each transactional state such that 601-605 correspond with states 701-705, and, in a further embodiment, a closed icon may correspond with state 706. In an embodiment, each transactional state may correspond with steps of the user service transaction as embodied in FIG. 5. In said embodiment, steps S501-S503 for "Create Ticket," "Build Ticket," and "Submit Ticket," respectively correspond to the "New" transactional state for which icon 601 may be displayed upon the ticket; step S504 for "Perform Inspection" corresponds to the "Submitted for Inspection" transactional state for which icon 602 may be displayed; steps S505-S506 for "Review Inspection" and "Submit Ticket" respectively correspond to the "Inspection Complete" transactional state for which icon 603 may be displayed; step S507 for "Perform Service" corresponds to the "Submitted for Service" transactional state for which icon 604 may be displayed; and step S508 for "Pay" corresponds to the "Service Complete" transactional state for which icon 605 may be displayed. The transactional state "Done" may be associated with tickets which have been completed and paid.

An embodiment of a user interface with respect to or otherwise consistent with FIGS. 3-7 may be described further with reference to FIGS. 8-12. Various embodiments of a user interface as disclosed herein may generally provide at least three ways for users to input information: Radio Buttons may be the most usable, but also the most restrictive. They are desirable in many cases because they make options visible, clearly depict selections, and provide extremely simple choice. Dropdowns may be the second-most usable, but arguably provide greater possibility or flexibility. They are suitable for example when the number of valid choices exceeds two. Note that typical Windows and Linux system dropdowns are highly unusable on touch, and may preferably be modified for production. Text Inputs are arguably least usable, but also relatively flexible by comparison. Usability may be mainly compromised by the large-format touchscreen; in various embodiments both on-screen and physical keyboards are sub-optimal. Usability can be enhanced via auto-complete (e.g. customer name field) and input masking (e.g. customer input field). Text Inputs may preferably be validated on blur or after delay to avoid excessive errors.

Alerts may be lightweight, non-interactive popups containing small bits of information (e.g. legal disclaimers, error reporting). They may be dismissed by confirming or tapping anywhere outside their bounds. The interface uses colors to denote important items and information presented. Bright color is strictly reserved for action items requiring immediate attention. Given that (1) the interface is data-dense and (2) most viewers will be first-time, it is desirable to enforce hierarchy in this way.

Spatial transitions may help convey a sense of space to new users. Two examples of such transitions may be especially notable. First, Tires slides in above Services from screen bottom, which may convey that Tire Match is a temporary and modal experience existing alongside ticket creation. Second, the Service List slides out to the left once a ticket is submitted, which may convey that the user is 'leaving behind' these options while keeping their ticket around for future steps.

Interactive affordances (e.g. button styles, navigation & transitions), layout, and visual hierarchy (e.g. typesetting, type color, scale) may vary within the scope of a particular embodiment and one of skill in the art may appreciate that additional examples may be thoroughly considered and refined over many iterations without substantively altering the present disclosure.

For any one individual embodiment of a system as disclosed herein, the associated user interface is not limited to strict brand standards and may employ different palettes and typography in various iterations. The current visuals may however be optimized to achieve functional goals.

Figure 8:
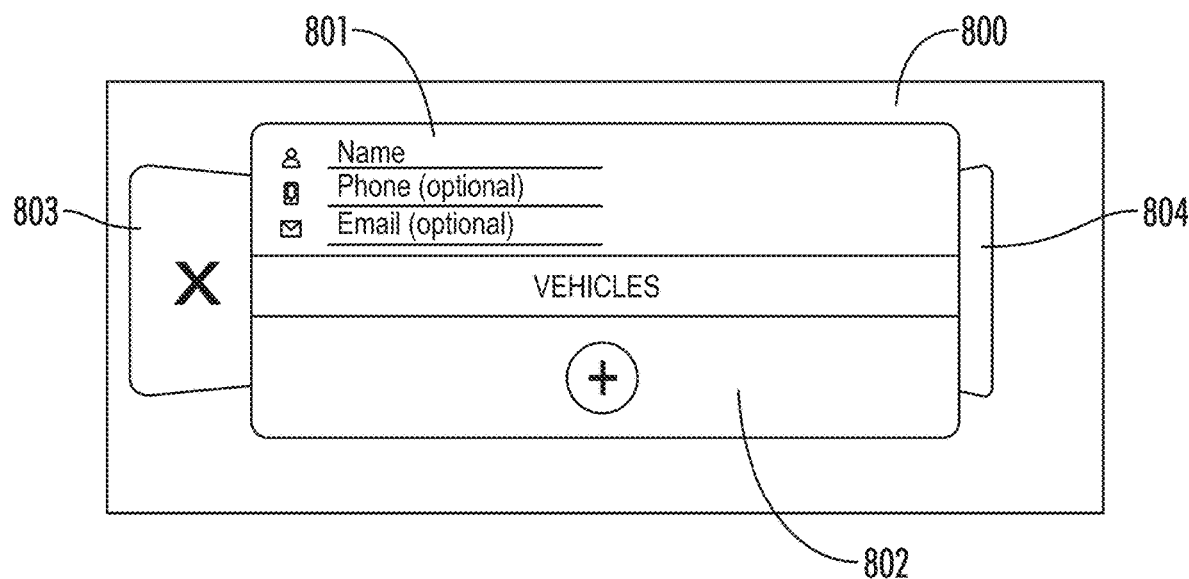
FIGS. 8-11 are graphical diagrams representing embodiments of an interactive interface design in accordance with the present disclosure.

FIG. 8 represents an embodiment of an interactive interface design in accordance with the present disclosure. The interface comprises a popup 800 comprised of a header 801 and a body 802, optionally including left and right paddles 803 and 804, and a drawer 805 that may expand out from behind the header and body based upon contextual configuration. The header 801 may for example be presented in white and associated with either static information or dynamic information associated with a preliminary input or inputs for user information. For example, a header may present a user with input fields for a new customer profile, wherein the header 801 prompts for the customer's name, phone number, and e-mail address. Other information may be prompted within the header, or alternatively static information may be presented.

In an embodiment, the body 802 may be presented in a contrasting color to the header. The body 802 may present textual and/or graphical information pertinent to the user. In an embodiment, the body may be dynamically populated based upon information entered by the user into the header 801, the body 802, and/or the drawer 805. For example, in FIG. 8, the body 802 displays the word "VEHICLES" with a circular plus-inscribed button. Other content may be present in the body 802 dependent upon the information or information request to be conveyed to the user. With respect to FIGS. 8-10, if the user presses the plus-inscribed button, a drawer 805 may optionally slide from the bottom of the body with user selections, allowing a user to add a customer vehicle and vehicle information associated with the customer profile.

In an embodiment, left paddle 803 may be inscribed with an "X" or a "skip back" icon such as a leftwards-facing arrow respectively in accordance with actions to close the current content or to return to content previous to the present header and body. In an embodiment, if the visible popup 800 is subsequent to one or more other popups to be presented in a series, then the left paddle 802 will be inscribed with the "skip back" icon or similar indicia of returning backwards in series, such that when a user touches the paddle he or she will be returned to the previous popup in the sequence. In an embodiment, if the visible popup 800 is not subsequent to one or more popups, then the left paddle 802 will be inscribed with an "X" icon or similar indicia of closing or cancelling the current popup, such that when a user touches the paddle the popup will clear itself of user-inputted information, minimize, or close. In FIG. 8, the right paddle 803 is minimized and withdrawn with the appearance of having retracted behind the header and body. In certain embodiments the left and right paddles 802 and 803 may be uniquely displayed in a withdrawn state such that the left and/or right paddle is only partially visible. Paddles 802 and 03 may be individually withdrawn when, based upon context, the user is not permitted to return or cancel, or proceed. For example, FIG. 8 demonstrates that the right paddle 803 is minimized when the user has not entered any information into the required header field for "Name." Upon entry of the customer name into the "Name" field, the right paddle 804 extends from the header 801 and body 802 into an extended configuration such as that depicted in FIG. 9, thereby enabling the user to touch the paddle 804 and associating user touch of the paddle 804 with a progressive activity such as, for example, submitting the current information and proceeding to the next popup screen, if any. In certain embodiments, the right paddle 804 may be inscribed with a context-sensitive icon pertaining to the action to be performed or general progress forward such as, for example, a rightward-pointing arrow. In certain embodiments, the right paddle 804 may be highlighted, colored, animated, made opaque, or made subject to other visually distinctive methods of conveying to the user that the paddle 804 is capable of receiving touch input and configured to allow the user to progress.

Figure 9:
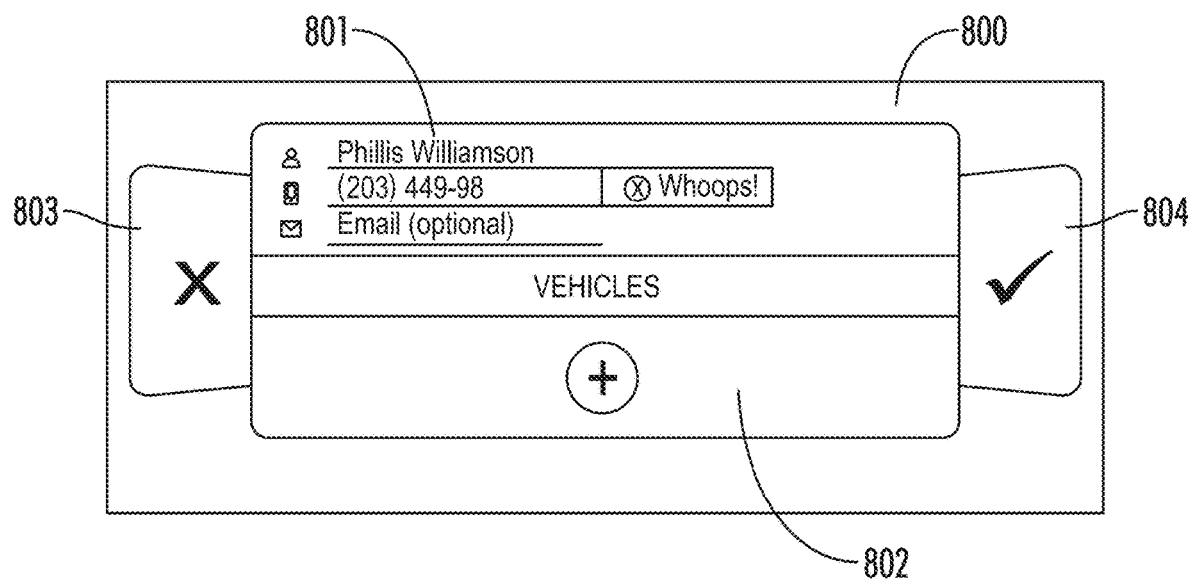

In FIG. 9 an error message dynamically appears when a user attempts to navigate away from the input field where the format of the user input is incorrect; in this example, the user has only entered eight of the ten requisite digits for a complete phone number. The error message may optionally be color-coded in a visually distinctive color from the remainder of the interface.

Figure 10:
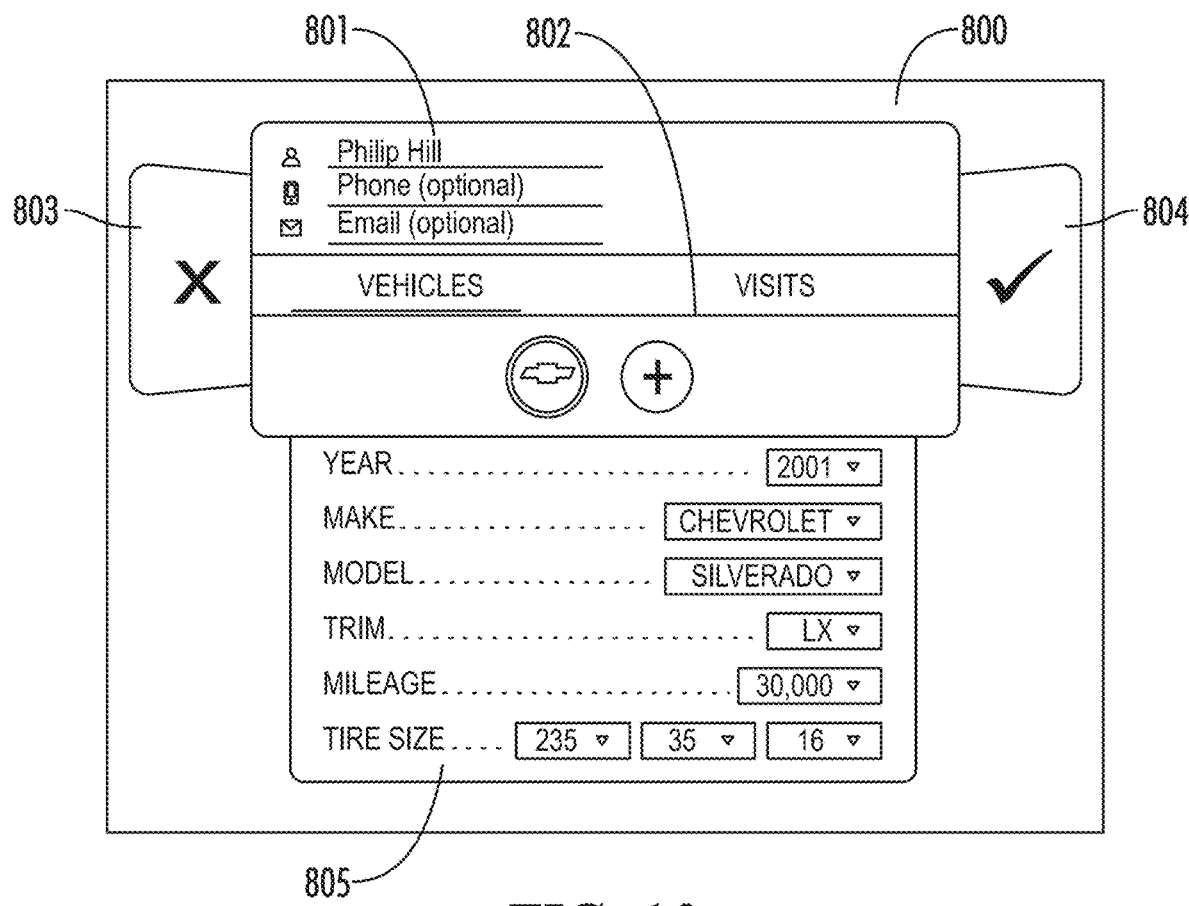

Upon a user's touching of certain interactive elements within the header 801 or body 802, a drawer 805 may appear beneath the body 802 as demonstrated in FIG. 10. In an embodiment, the drawer 805 may be animated so as to appear to extend from behind the body 802. The drawer 805 may contain various interactive elements and details associated with information or inputs within the header 801 or body 802. For example, FIG. 10 demonstrates a drawer with various vehicle information associated with a vehicle of the currently selected user. Various dropdown boxes are depicted, each expandable upon a user's touch, whereupon a user can select one of the items listed for each category.

Figure 11:
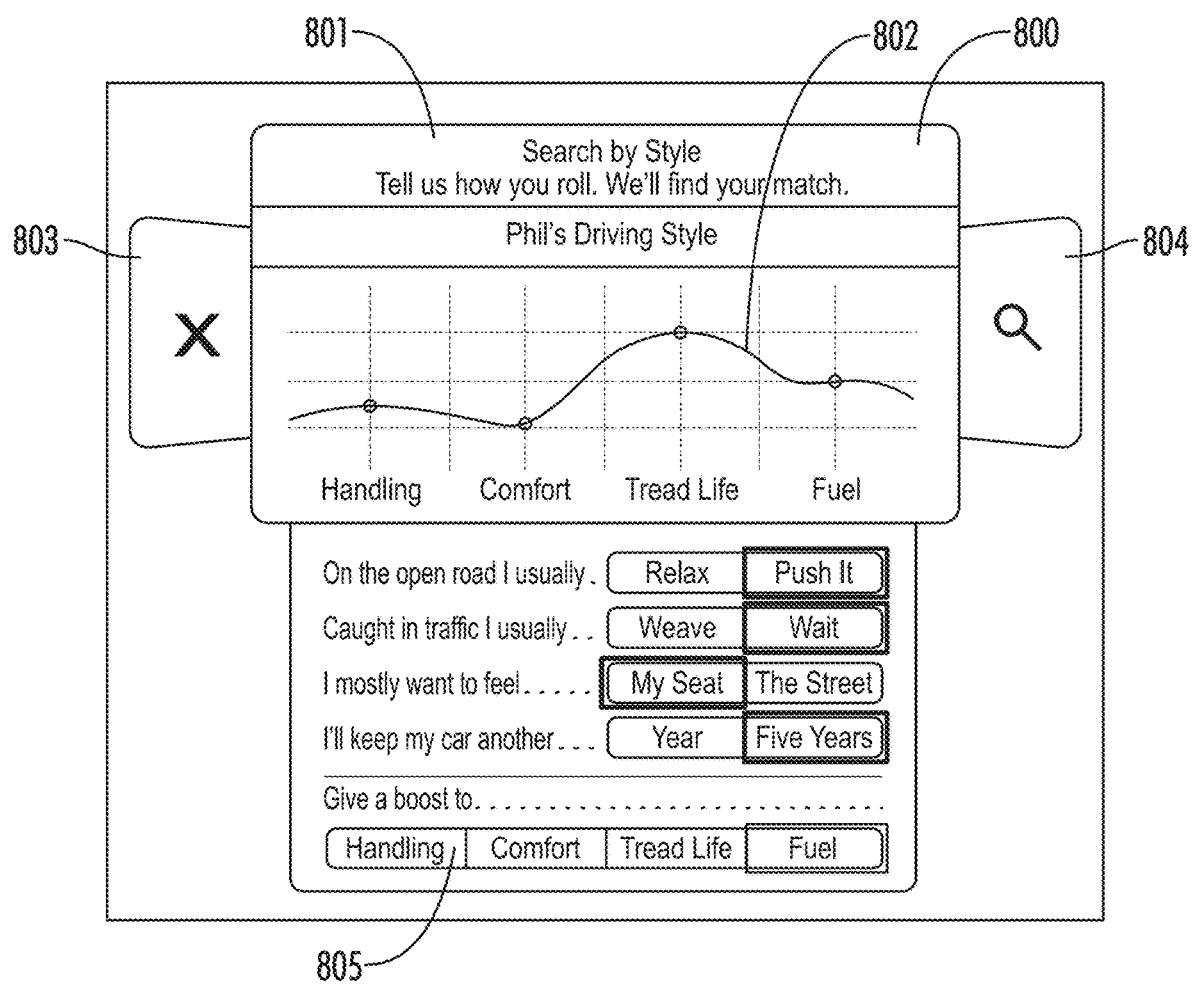

FIG. 11 is an exemplary user interface depicting the process for determining a customer's driving style in accordance with the method 400 described above. The header 801 provides textual information instructing the user to interact with the body 802, explaining that the process will allow the system to determine one or more tire matches. The body 802 depicts a graph comparing driving variables along one axis and relative importance along a second axis. Multiple questions and answers are presented beneath the graph for user selection. When a user selects an answer for each of the questions, the graph changes to reflect the adjustment to the one or more driving variables as made in method 400. In the present embodiment, a user may be able to directly modify one of the driving variables by selecting one of the variables under the "give a boost to" category, whereupon the associated driving variable will increase in relative importance. In certain embodiments, a user may be able to directly modify the graph by dragging the one or more data points for each variable along the relative importance axis. The right paddle 804 depicts a context-sensitive icon of a magnifying glass to indicate that, upon a user's touch of that paddle 804, the system will search for tires that match the depicted customer driving style. In an embodiment, selection of the right paddle 804 will invoke the performance of method 300 described above.

Figure 12:
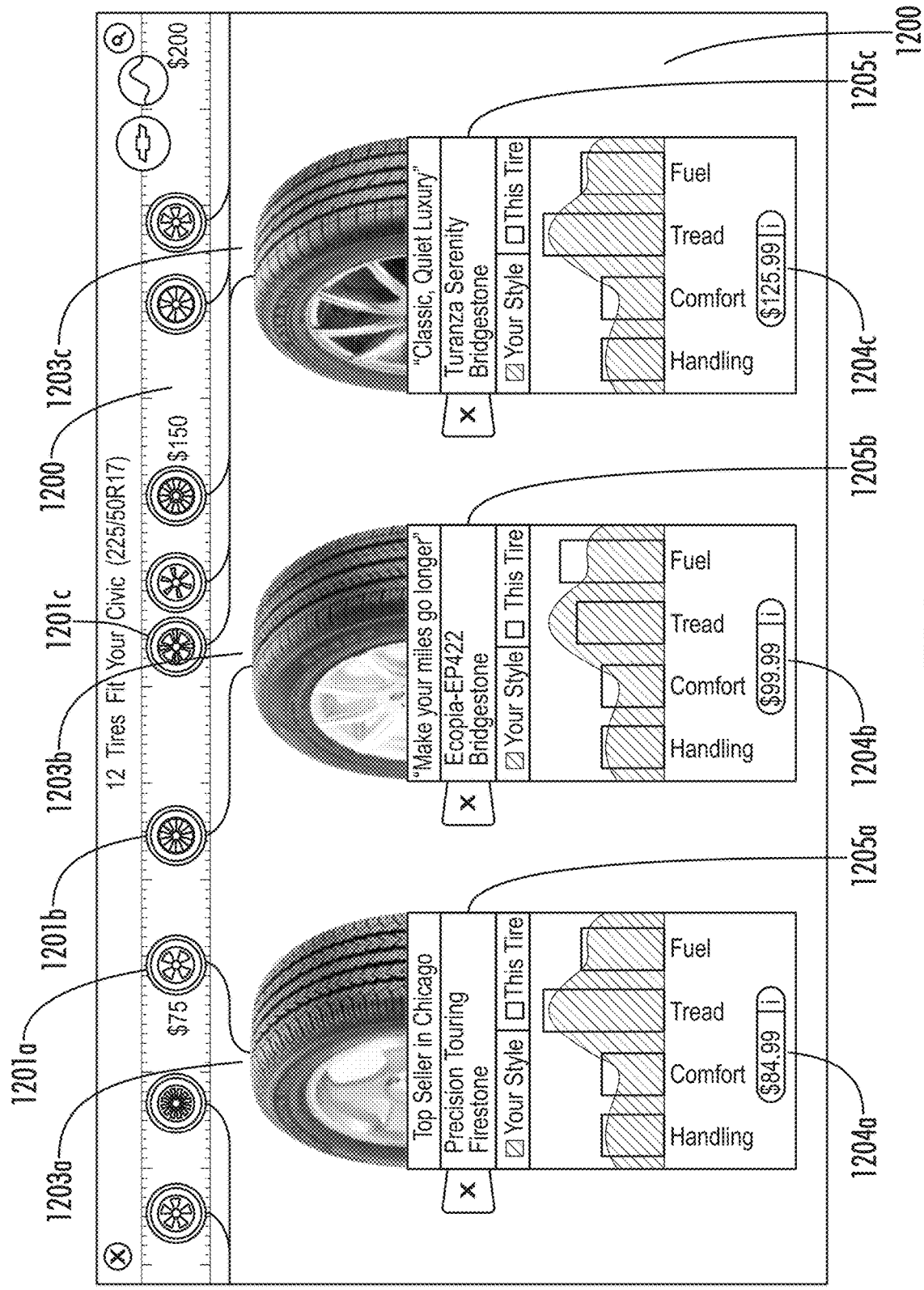
FIG. 12 is a graphical diagram representing an embodiment of an interface design for a tire carousel.

FIG. 12 is a graphical diagram representing an embodiment of an interface design for a tire carousel. In an embodiment, the tire carousel may be presented to a user upon completion of method 300 where one or more tire matches have been determined for a customer's driving style. A header 1200 may present icons for various brands of tires. In an embodiment, the header may be scrollable based upon user touch input, such as, for example, when a user drags his or her finger across the header to scroll from left to right. In an embodiment, a user may optionally select one or more of the presented tire icons in the header 1200, whereupon the icons become highlighted (1201a-1201c) and populate a second portion of the screen 1202 with popups depicting associated tires' tire images 1203*a*-1203*c* and tire profile information 1204*a*-1204*c*. In an embodiment, the popups may be embodied in the visual interface in accordance with the description of popup 800. The tire popups may include a tire title and brand 1205*a*-1205*c*. In an embodiment, the tire popups may display the tire profile information 1204 for each tire in accordance with the body graph described in FIG. 11, such that the tire profile information is displayed as a bar chart, the customer driving style graph overlaid in front of the bars to depict the relative difference between the tire profile information and customer driving style for each variable presented.

The user may close each tire popup by pressing the respective left paddle 804*a-c* or may select a tire for purchase by selecting the price button 1206*a-c*. In an embodiment, the user may select an icon 1207*a-c* to retrieve more information about each respective tire. In an embodiment, the user may select an icon 1208 to change the vehicle for which the tire matching algorithm 300 selects the appropriately fitting tires or may select an icon 1209 to change the composition of the customer driving style in accordance with method 400.

Figure 13:
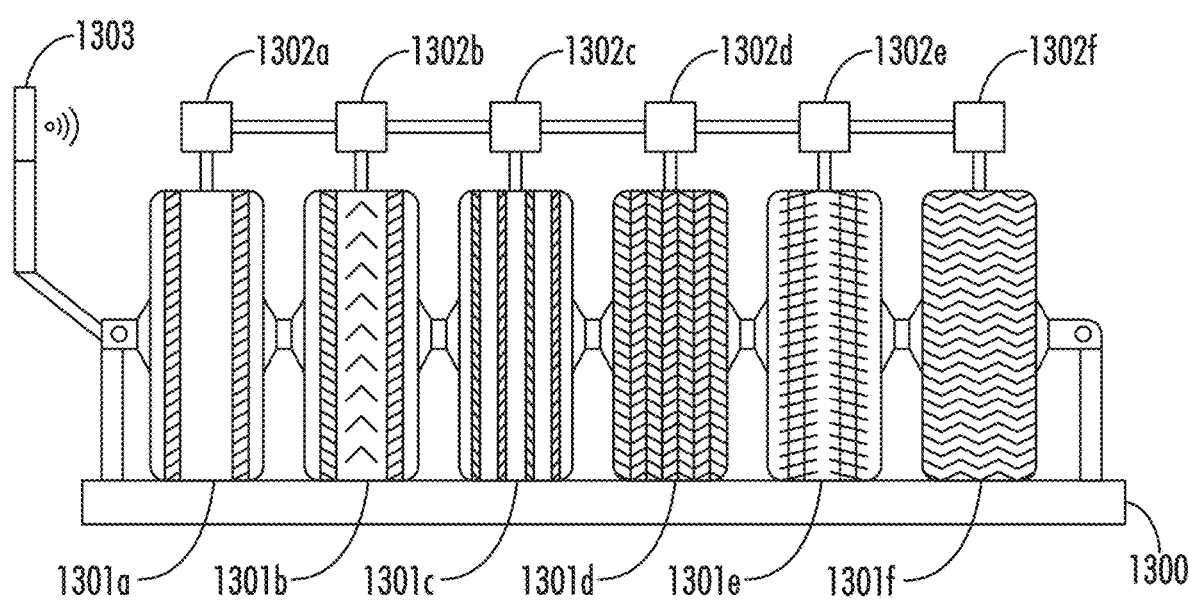
FIG. 13 is a block diagram representing an embodiment of a user-interactive tire rack in accordance with the present disclosure.

FIG. 13 is a block diagram representing an embodiment of a user-interactive tire rack in accordance with the present disclosure. A tire rack base 1300 contains a plurality of differentially branded tires 1301*a*-1301*f*, each tire associated with a unique tire identification token 1302*a*-1302*f*. The tire identification tokens 1302 may be a computer-readable, information-bearing object such as, for example, a barcode, Quick Response (QR) code, 3D barcode, near-field communication (NFC) beacon, Bluetooth beacon, radio frequency identification (RFID) chip, and the like. The tire identification tokens 1302 may be individually scanned by a tire scanner 1303 connected to the tire rack base 1300. The tire scanner 1303 may be further communicatively connected to the computer kiosk 10 as described in FIG. 1, such that when a tire identification token 1302 is scanned, the computer kiosk 10 may present information about the associated tire upon the touchscreen 18.

In certain embodiments, the tire identification tokens 1302 may be readable by a customer's mobile device 26. In an embodiment, a customer may scan the tire identification tokens 1302 and be presented on the customer's mobile device 26 with information pertaining to the associated tire 1301 in accordance with a mobile application. In another embodiment, the customer may visually scan a plurality of tires 1301 and/or tire identification tokens 1302 with a camera upon the customer's mobile device 26 and be presented with an augmented reality depiction upon the customer's mobile device 26 of tire information. For example, a customer may direct his or her camera at the tire rack base and, in accordance with tires selected via the tire matching algorithm 300, see upon the device's screen the one or more matching tires highlighted from the plurality of total tires on the tire rack base 1300 and annotated with associated tire information for each of the highlighted matching tires. In an embodiment, the tire rack base 1300 may be mechanically configured to present a plurality of tires in sequential order or sequentially ordered sets such as, for example, via a conveyor. In a further embodiment, the tire rack base 1300 may be configured to present the one or more matching tires for a customer automatically upon determination of the one or more matching tires via method 300.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. A system for providing decision support to consumers of vehicle tires, the system comprising:
  a tire scanning device communicatively linked to a hosted server and configured to generate information corresponding to one or more vehicle riding characteristics of a current tire for a vehicle;
  a tire database linked to the hosted server and comprising tire profile information for each of a plurality of available tires, wherein the tire profile information for each tire comprises respective values for each of a plurality of variables;
  a user interface linked to the hosted server and configured to receive driving style inputs from a user associated with the vehicle; and
  wherein the server is configured to
    generate driving style information of the user comprising values for each of the plurality of variables, wherein the driving style information is generated based on the driving style inputs from the user and the information corresponding to the one or more vehicle riding characteristics of the current tire generated via the tire scanning device,
    match one or more of the plurality of available tires to the user based on a comparison of the generated driving style information of the user and the tire profile information for each tire, and
    present the one or more matched available tires for user selection via the user interface.

2. The system of claim 1, wherein the server matches the available tires to the user by
  filtering a subset of the available tires based on a tire size of the current tire of the vehicle,
  graphically representing the generated driving style information of the user and the tire profile information for each tire with the plurality of variables similarly ordered, wherein respective characteristic curves are drawn to intersect the values corresponding to each of the plurality of variables, and
  mapping the characteristic curves for the graphically represented tire profile information for each of the subset of available tires against the characteristic curve for the graphically represented driving style of the user as a first characteristic curve.

3. The system of claim 2, wherein the server further matches the available tires to the user by identifying one or more of the subset of available tires having a lowest deviation in their respective characteristic curves with respect to the first characteristic curve.

4. The system of claim 2, wherein the server further matches the available tires to the user by identifying one of the subset of available tires having a highest ranking with respect to each of a plurality of tire criteria,
  wherein one or more of the criteria are selected from a group comprising: highest average quality rating; lowest price; best fit; and highest popularity rating.

5. The system of claim 2, wherein for each of the presented one or more matched tires, the user interface further displays the respective characteristic curves mapped against the first characteristic curve.

6. The system of claim 1, wherein the server is further configured to retrieve and display on the user interface in substantially real time one or more status indications selectable from among a vehicle inspection result set, a pending tire service and a predicted performance for associated tire goods.

7. The system of claim 1, further comprising a user-interactive tire rack having:
   a tire rack base having one or more of the available tires disposed thereon and each associated with a unique tire identification token; and
   a tire scanner communicatively linked to the hosted server,
   wherein upon scanning by the tire scanner of a unique tire identification token, information about the tire associated with the respective token is generated on the user interface.

8. The system of claim 1, further comprising a tire rack base mechanically configured to present the one or more available tires matched to the user automatically upon determination of the matched tires.

9. The system of claim 1, wherein the user interface comprises a shared computer kiosk display, the system further comprising a user-interactive tire rack having:
   a tire rack base having one or more of the available tires disposed thereon and each associated with a unique tire identification token; and
   a second user interface comprising an augmented reality depiction of the one or more available tires matched to the user and generated on a computing device for the user associated with the vehicle,
   wherein upon scanning by the user computing device of the one or more available tires, the one or more available tires matched to the user are highlighted and annotated with associated tire information.

10. A computer system for providing decision support to consumers in the context vehicle tire product purchases, the system comprising:
    means for storing information regarding available tire products for purchase from a host entity;
    means for obtaining information regarding scanned characteristics of a current vehicle tire and user input corresponding to a driving style with respect to a consumer;
    means for determining a driving style for the consumer as corresponding to stored information regarding available tire products for purchase from the host entity, based on the obtained information;
    means for matching one or more particular tire products to said consumer based at least in part on the stored information and the determined driving style;
    means for generating an interactive interface on a display for one or more devices selectable from among a personal consumer device, a personal host device and a shared kiosk device, said interface displaying selectable options regarding the matched tire products; and
    means for retrieving and displaying ticket information on a display for one or more devices selected from among the personal consumer device and the shared kiosk device, the ticket information displayed in substantially real time regarding a tire product transaction for the consumer.

11. The computer system of claim 10, wherein each available tire product comprises one or more tire goods, tire services, or a combination thereof.

12. The computer system of claim 11, wherein the ticket information regarding a tire product transaction comprises one or more status indications selectable from among a vehicle inspection result set, a pending tire service and a predicted performance for associated tire goods.

13. The computer system of claim 10, further comprising:
    means for dynamically adjusting a physical presentation of a plurality of available tires based on the one or more matched tire products.

* * * * *